No. 714,038. Patented Nov. 18, 1902.
J. A. RUSSELL.
PROCESS OF BURNING WOOD OR CHARCOAL FUELS, &c.
(Application filed June 30, 1899.)

(No Model.) 2 Sheets—Sheet 1.

WITNESSES:
E. S. Lemme
L. A. Nicholson

INVENTOR:
James A. Russell
BY
G. W. Bullard
ATTORNEY

No. 714,038. Patented Nov. 18, 1902.
J. A. RUSSELL.
PROCESS OF BURNING WOOD OR CHARCOAL FUELS, &c.
(Application filed June 30, 1899.)
(No Model.) 2 Sheets—Sheet 2.

WITNESSES;
E. S. Lemmer
L. A. Nicholson

INVENTOR;
James A. Russell
BY
G. W. Bullard
ATTORNEY

UNITED STATES PATENT OFFICE.

JAMES A. RUSSELL, OF TACOMA, WASHINGTON.

PROCESS OF BURNING WOOD OR CHARCOAL FUELS, &c.

SPECIFICATION forming part of Letters Patent No. 714,038, dated November 18, 1902.

Application filed June 30, 1899. Serial No. 722,429. (No specimens.)

*To all whom it may concern:*

Be it known that I, JAMES A. RUSSELL, a citizen of the United States, residing at Tacoma, in the county of Pierce and State of Washington, have invented or discovered a new and useful Process of Burning Wood or Charcoal Fuels and Producing a Very High Heat Therefrom, of which the following is a specification.

My invention pertains to the use of wood or charcoal for fuel in furnaces for the reduction of ores, for steam-boilers, and for other purposes.

The objects of my invention or discovery are, first, to produce a high heat from wood or charcoal, and, second, to utilize the maximum amount of heat contained therein.

Heretofore wood and charcoal have been used for fuel in furnaces or fire-boxes where the combustion is produced by a constant draft of cold air therethrough. By this process the heat obtained never reaches a high degree suitable for smelting and reduction of ores and for other purposes where a high heat is required. Much of the heat of combustion is absorbed by the cold fuel and the cold air, and the combustion is not thoroughly complete, a large part of the fuel substance passing off in smoke.

I have discovered by a series of careful tests and experiments that by supplying the fuel, wood, or charcoal with a draft of highly-heated air in a previously-heated furnace I attain a combustion that produces a very intense heat, equal to if not superior to superheated gaseous fuels now commonly used. The most complete combustion is attained, there being a minimum waste in smoke and ashes.

My process attains the best results when used in a pair of furnaces or fire-boxes one used alternately with the other and each furnace provided with a set of flues that are alternately superheated by the waste products of combustion passing through them to the smoke-stack.

My process may be better understood when explained with the accompanying drawings, in which—

Figure 1:
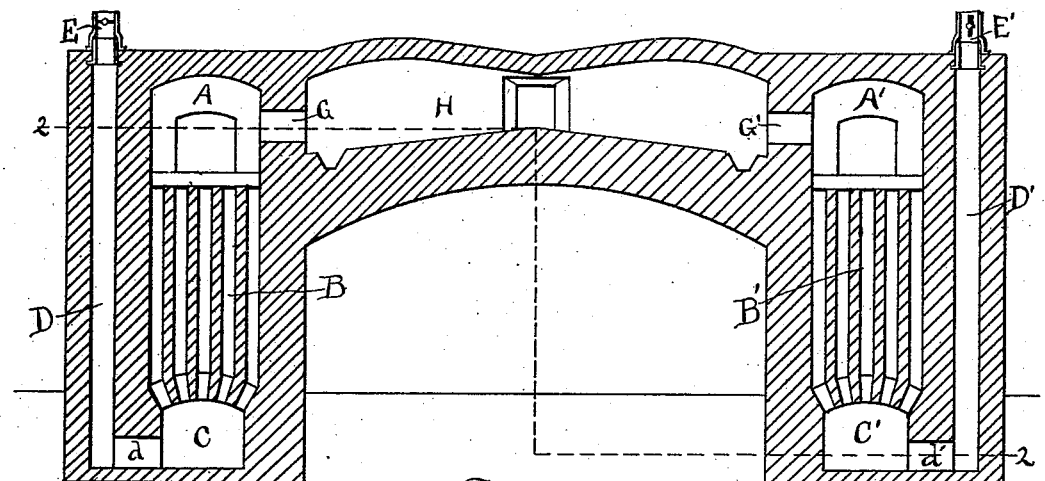
Figure 2:
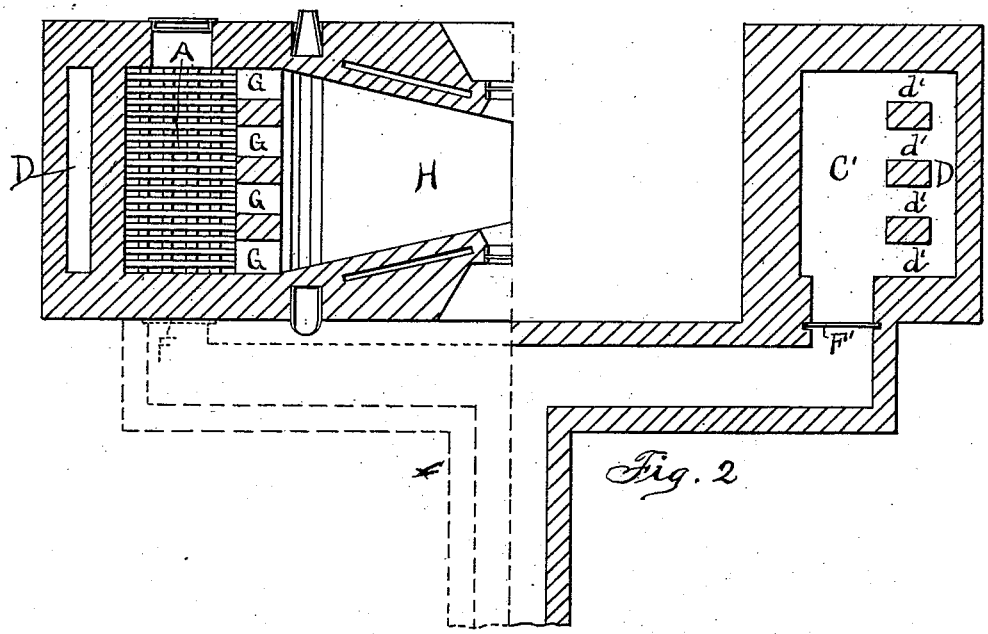
Figure 3:
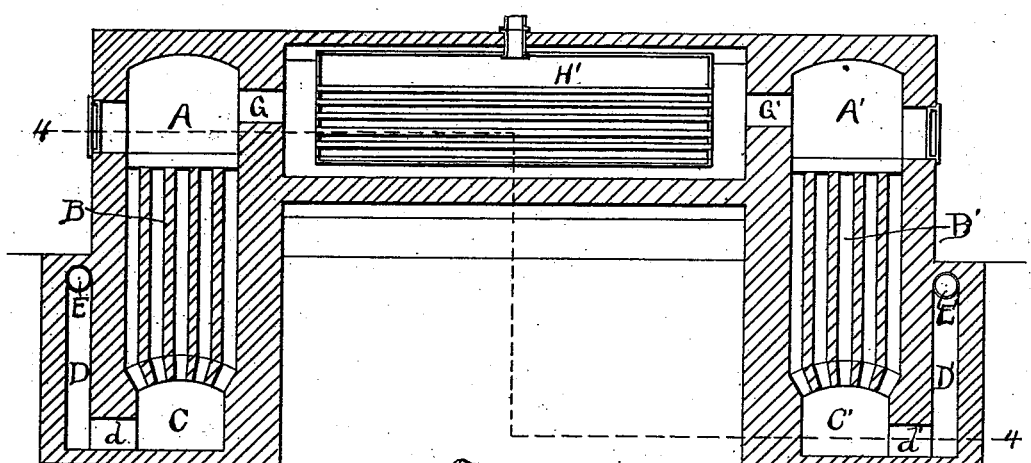

Figure 1 is a vertical section through a pair of furnaces designed for my process with a smelting-hearth located between them. Fig. 2 is a horizontal section or plan at 2 2. Fig. 3 represents a pair of furnaces in section designed for a battery of steam-boilers, and Fig. 4 is a plan section at 4 4.

The fire-boxes A and A' are designed to be used alternately, and each is located over a chamber of narrow flues B B', which open at the bottom into flues C C', leading to the main smoke-stack. Into each of the flues C and C' an air duct or flue D D' opens through the ports $d$ $d'$. These ducts are alternately supplied with air from a blast-fan through the pipe connections E E'.

A fire is started in one of the fire-boxes, as A, with air blown in through the pipe E, the gate F connecting with the smoke-stack being closed. The products of combustion pass through the ports G, through the smelting or reducing chamber H, thence out the ports G' into the fire-box A', down the flues C', and out the gate F' into the smoke-stack. The waste products of combustion in time cause the brickwork of the fire-box and flues to become hot. Fuel is then placed in A' and the air turned on through E', and the gate F' is shut. The air is shut off in E and the gate F is opened, all of which reverses the operation of the furnaces. The waste products of the combustion now cause the brickwork of A and B to become heated. When the two furnaces become well heated by thus alternately using them as a combustion-chamber, my process may be used with results that are highly satisfactory. The heated air rising slowly through the fire-box unites in combustion with the heated wood or charcoal and steadily consumes every particle of combustible substance contained therein. The heat produced readily smelts and reduces the most refractory ores. The degree of heat can be easily regulated and varied by the amount of fuel and air used. The combustion produced is the most perfect obtainable, and the flames spread and float into every part of the combustion or smelting chamber, and a larger per cent. of the fuel substance is utilized than in any process of burning wood or charcoal in use previous to my discovery.

Figure 4:
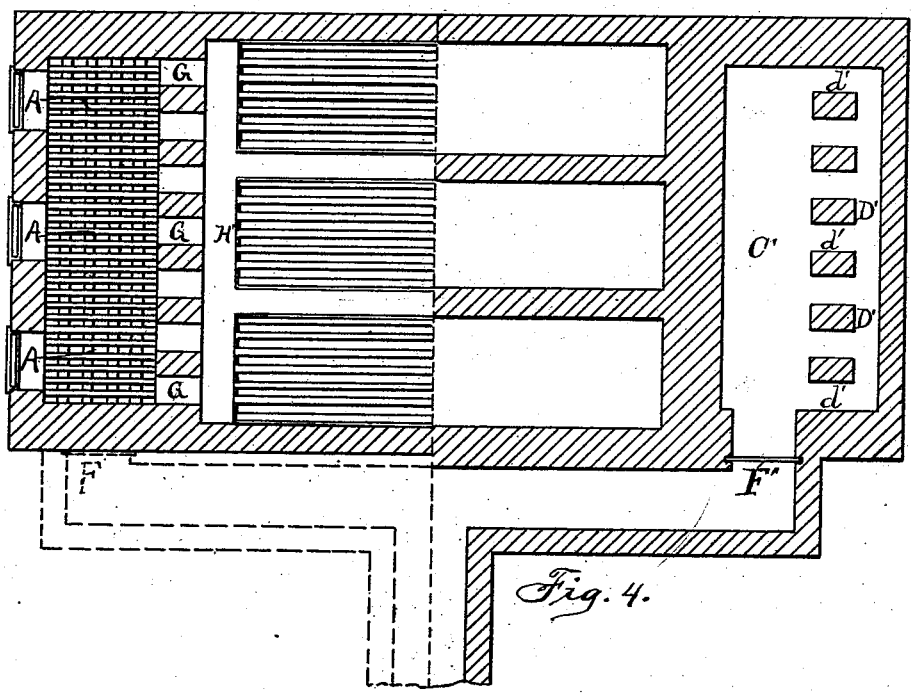

Figs. 3 and 4 illustrate a pair of furnaces arranged for a battery of steam-boilers and as required to apply my process to one or more boilers. The operation is practically the same as described for Figs. 1 and 2.

It is well known that hot air has heretofore been used in combination with gas and other fuels, but with wood and charcoal fuels it has not to my knowledge ever been used. I do not, therefore, wish to be understood as making a broad claim in the use of heated air to attain a high heat in the combustion of fuels.

I therefore claim—

1. The within method of producing a high temperature from wood or charcoal fuel for heating an object to be operated upon, consisting in impelling air upward through a heat-storage chamber and from thence up through the wood or charcoal fuel, thence directing the gases laterally across the object to be operated upon, and thence downwardly through a heat-absorbing chamber, substantially as described.

2. The within method of producing a high temperature from wood or charcoal fuel for heating an object to be operated upon, consisting in impelling the air upward through a heat-storage chamber and from thence up through a bed of wood or charcoal in a fuel-chamber, thence directing the gases laterally across the object to be operated upon, thence downwardly through a fuel-chamber and a heat-absorbing chamber; and subsequently impelling a reversed current of air upward through said heat-absorbing chamber wherein the air becomes highly heated and from thence up through a bed of wood or charcoal fuel in the fuel-chamber, thence directing the gases laterally across the object to be operated upon, and thence downwardly through the first fuel-chamber and down through the heat-storage chamber, wherein heat is extracted from the air, and so on in alternation, substantially as described.

In testimony whereof I affix my signature in the presence of two witnesses.

JAMES A. RUSSELL.

Witnesses:
F. L. DEUMAN,
G. W. BULLARD.